United States Patent [19]

Leemkuil et al.

[11] Patent Number: 4,562,921
[45] Date of Patent: Jan. 7, 1986

[54] TRACK FOR CONVEYOR CHAIN

[75] Inventors: Hendrik Leemkuil; Samuel J. Deman, both of Grand Rapids; Peter M. Perdok, Ada, all of Mich.

[73] Assignee: Lear Siegler, Inc., Grand Rapids, Mich.

[21] Appl. No.: 548,459

[22] Filed: Nov. 3, 1983

[51] Int. Cl.$^4$ ............................................. B65G 15/60
[52] U.S. Cl. ................................... 198/841; 198/860.1
[58] Field of Search ...................... 198/790, 841, 860

[56] References Cited

U.S. PATENT DOCUMENTS

| | | | |
|---|---|---|---|
| 3,189,161 | 6/1965 | Schneider et al. | 198/787 |
| 3,312,330 | 4/1967 | Juengel | 198/366 |
| 3,491,873 | 1/1970 | Fauth | 198/841 X |
| 3,596,752 | 8/1971 | Garvey | 198/860 X |
| 3,605,994 | 9/1971 | Parlette | 198/860 |
| 3,724,646 | 4/1973 | Kornylak | 198/841 X |
| 3,768,624 | 10/1973 | Kornylak | 198/734 |
| 3,881,594 | 5/1975 | Jepsen | 198/841 X |
| 3,885,837 | 5/1975 | Mellor | 198/841 X |
| 4,074,805 | 2/1978 | Bodewes | 198/790 |
| 4,358,010 | 11/1982 | Besch | 198/841 X |
| 4,458,809 | 7/1984 | White et al. | 198/790 |

Primary Examiner—Joseph E. Valenza
Assistant Examiner—Jonathan D. Holmes
Attorney, Agent, or Firm—Price, Heneveld, Huizenga & Cooper

[57] ABSTRACT

A track for conveyor chain is provided by a plastic member having sides and a flat cross web supported by a U-shaped channel to provide a low friction guide way for both the upper and return runs of the chain. The plastic guide way for both runs can be a pair of identical members or a single extrusion. The guide way and channel can be factory assembled in units of suitable length and mounted to the conveyor track at the point of installation with use of simple tools and without requiring any special skills.

11 Claims, 9 Drawing Figures

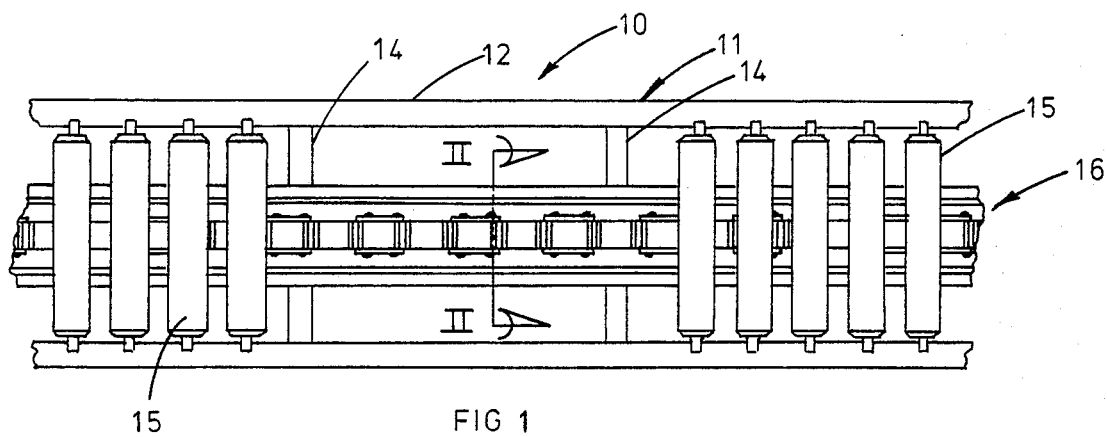
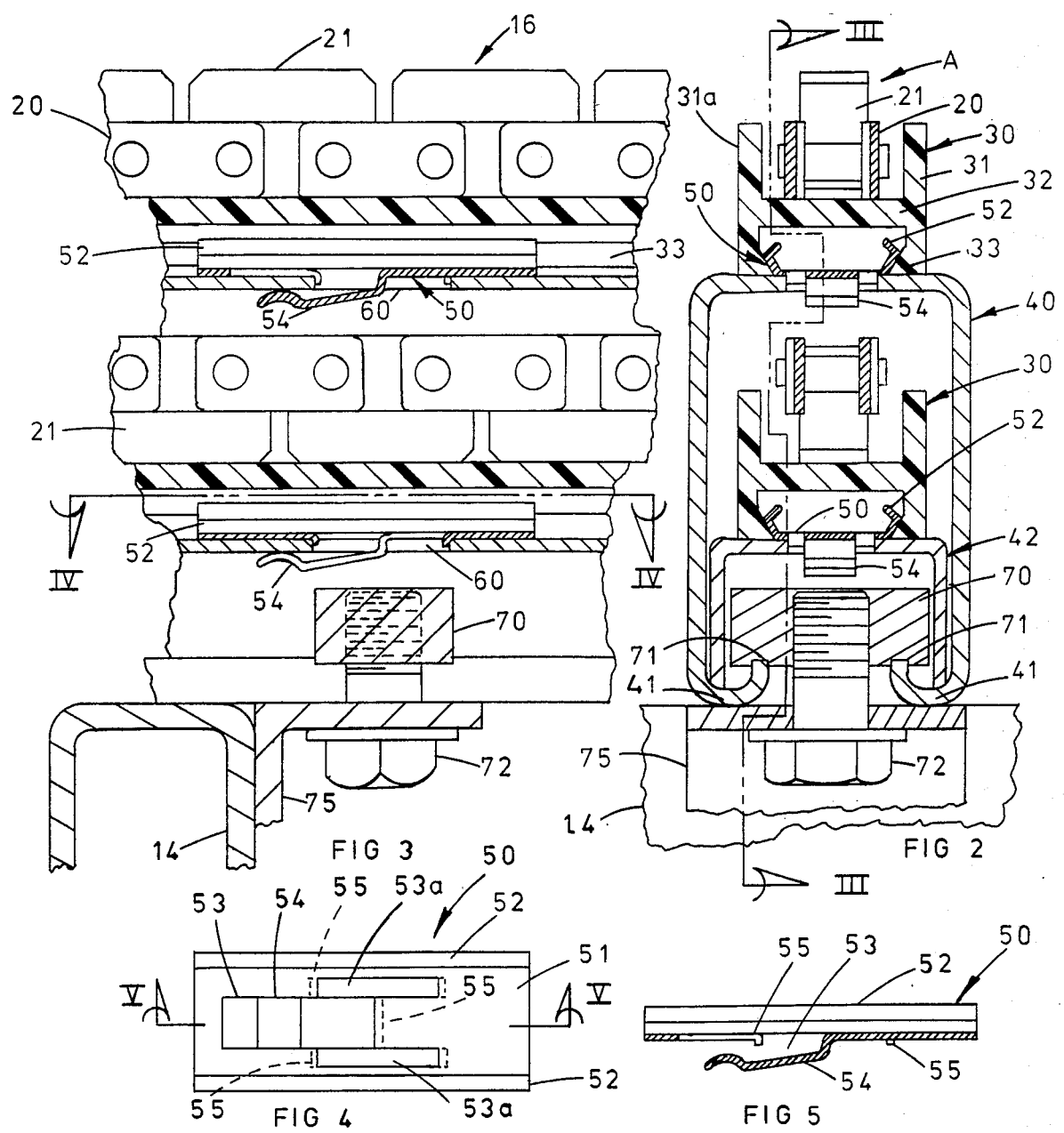

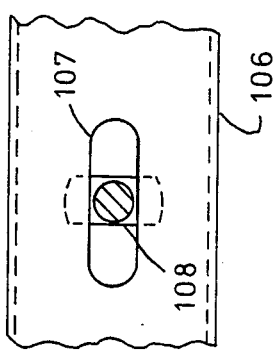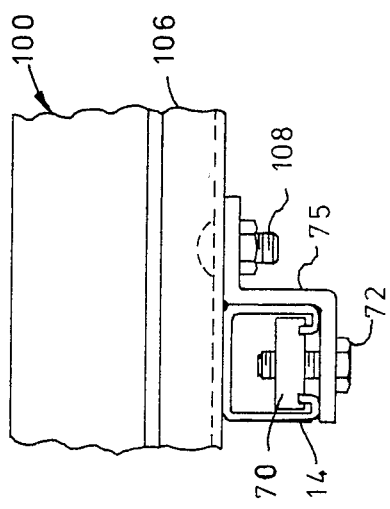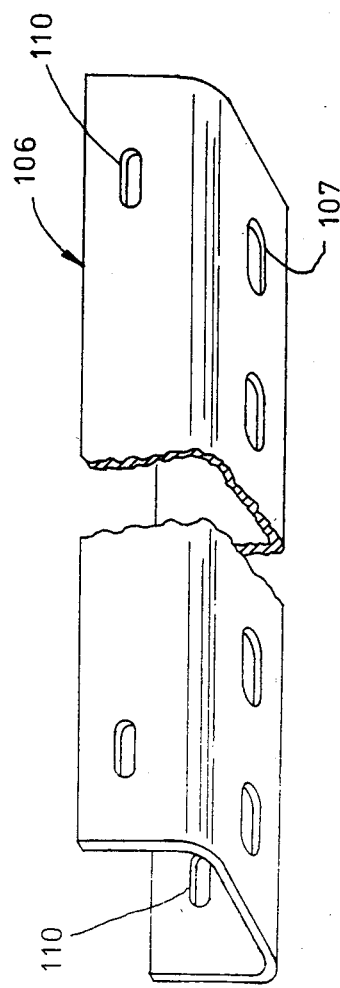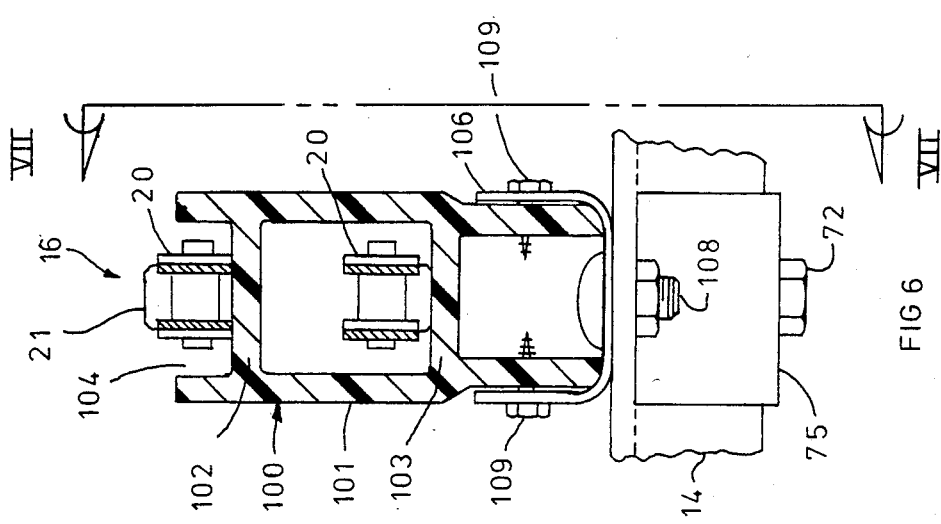

TRACK FOR CONVEYOR CHAIN

FIELD OF THE INVENTION

This invention relates to conveyor track and particularly to the construction of a unified, compact track to handle both the advance and the return runs of a chain conveyor.

BACKGROUND OF THE INVENTION

While conveyors utilizing chains have long been used, the construction of the supporting track has presented problems which have not heretofore been satisfactorily solved. As the cost of labor and materials has increased, it has become increasingly necessary to provide conveyor track of a construction such that the need for tools or specialized skills is materially reduced or eliminated. To this extent there has been an increasing necessity for simplified constructions which do not utilize conventional fasteners for installation and preferably such equipment which can be preassembled at the factory in modular form. Further, such equipment should be adaptable to a wide range of conveyor installations and sufficiently compact to be used with a wide range of conveyors. It is also essential that it be of a construction which materially decreases the noise level of the conveyors when in operation. At the same time, to avoid costly maintenance and down time the construction should be characterized by durability. The enclosure of the return runs of the chain both contributes to improved safety and shields the chain from dirt and chemicals which accelerate wear.

BRIEF DESCRIPTION OF THE INVENTION

The invention provides a unified track which may be assembled in modules to support both the advance and the return runs of a chain conveyor. Each module can be assembled as a self-contained, compact unit except for the chain itself and shipped to the installation site in such condition that no further assembly in necessary other than to join the modules together to form the completed conveyor track. At the site the track can be secured simply by bolting it at suitable intervals to the cross members of the conveyor frame. The track provides a durable plastic, low friction support for both runs of the chain, reducing wear and noise. If it is not desired to preassemble it at the factory, the several components making up each modular section can be simply and quickly assembled at the installation site with minimum use of tools, thus materially reducing the skill and experience necessary to install the track. At the same time, the track provides a rigid support for the chain and positively hold it in a position such that it contacts and drives conveyor rollers or the articles themselves.

DESCRIPTION OF THE DRAWINGS

FIG. 1 is a fragmentary, plan view of a section of roller conveyor from which some of the rollers have been removed to better illustrate the conveyor's construction;

FIG. 2 is an enlarged, sectional view through the chain track taken along the plane II—II of FIG. 1;

FIG. 3 is a sectional view taken along the plane III—III of FIG. 2;

FIG. 4 is a plan view of one of the attachment clips used with this invention;

FIG. 5 is a sectional view of the clip taken along the plane V—V of FIG. 4;

FIG. 6 is a sectional view similar to FIG. 3 illustrating a modified form of the invention;

FIG. 7 is an oblique view of the support channel for the track illustrated in FIG. 6;

FIG. 8 is a fragmentary view taken along the plane VIII—VIII of FIG. 6; and

FIG. 9 is a fragmentary bottom view of the channel illustrated in FIG. 7 showing one of the mounting bolts in place.

DESCRIPTION OF THE PREFERRED EMBODIMENT

Referring to FIG. 1, the numeral 10 indicates a conveyor having a frame 11 consisting of a pair of side rails 12 and 13 rigidly joined at suitable intervals by cross members 14. In the particular type of conveyor illustrated, the conveying surface is formed by a plurality of rollers 15 supported on the side rail members 12 and 13. Beneath the rollers 15 is a propelling member 16. The propelling member 16 has as its tension carrying element a chain 20 to which pads 21 are attached to provide the roller contacting surface. The use of pads for this purpose is conventional and is frequently utilized because they provide the desired coefficient of friction to assure a driving connection between the chain and the rollers and also to reduce wear and noise. The chain has an upper or advance run A and a lower or return run B (FIG. 2). In both cases, the chain slidably travels along a guide rail 30 which, in cross section, has the general shape of the letter H. As such it has a pair of upstanding sides 31 and 31a joined by a web 32. The web is spaced from both ends of the legs. Preferably it is spaced further from the upper ends of the legs than the lower ends. The lower ends of each of the legs have inwardly directed ears 33 which preferably have an outwardly and upwardly inclined upper surface. While the guide track can be fabricated of a number of suitable materials, it preferably is extruded from a synthetic resinous material having lubricious property and a high resistance to wear. An example of a suitable material is an extruded ultra high molecular weight polyethylene. The identical guide rail construction is used for both the upper and lower guide rails, that is, for both the advance and the return runs.

The structural support for the guide rails is an outer channel 40 of inverted U-shaped cross section. The lower ends of the channel form re-entrant flanges 41, the free ends of which are further bent to extend upwardly. Seated within the channel 40 is an inverted U-shaped inner or base channel 42. The ends of the legs of the inner channel 42 rest on the inner surfaces of the flanges 41. The guide rail for the return is seated upon and supported by the inner channel 42.

The guide rails are secured to their respective supporting channels by clips 50. Each clip 50 consists of an elongated, rectangular body 51 having an outwardly extending clamping finger 52 extending along each side (FIGS. 4 and 5). The fingers 52 are generally V-shaped in cross section with the apex extending laterally outwardly whereby the upper portion of each ear serves as a camming surface to force the ears to converge when they are pushed through an opening narrower than the maximum width of the fingers. The clip has an elongated central opening 53. The material displaced in forming the opening 53 is formed into a downwardly offset tongue 54 integral at one end with the body of the clip. Portions 53a of the opening 53 extend oppositely from the tongue 54 beyond the base of and along each side of the tongue (FIG. 4). At both ends of the opening 53 the clip has short downwardly turned ears 55 (FIG. 5).

The clips 50 are designed to cooperate with rectangular openings 60 formed at spaced intervals in the top web of both the inner and the outer channels (FIG. 3). The length of each of the openings 60 is such that when the clips are fully seated, the ears 55 engage opposite ends of the opening to prevent the clip from shifting lengthwise of the channels. At the same time the tongue 54 extends through the opening and presses against the inside surface of the web of the channel to which it is attached to prevent the clip from being lifted from the channel. Once the clips have been installed, the guide track members can be attached simply by pressing them down over the fingers 52. Because of the existence of the ears 33, the fingers will be caused to converge sufficiently to permit the ears to pass. Then the upwardly and outwardly sloping surface of the lower part of each of the fingers will engage the wedge-like upwardly sloping surface of the ears both drawing the guide rails down firmly against the surface of the channels and firmly holding the guide rails against inadvertent lateral displacement. The assembled guide rail 30 and inner or base channel 42 can be inserted lengthwise into the outer channel 40 ready to receive the chain.

All of the components of the chain support, that being the inner and outer channels and the upper and lower guide rails can be preassembled in modular units ready for attachment to the conveyor frame 10. Attachment is accomplished simply by inserting nuts 70 at suitable intervals into the bottom of the outer channel and within the inner channel and seating them on the upturned ends of the flanges 41. The nuts are then aligned with a Z-bracket 75 which is bolted to one of the cross members 14 to secure the chain track in place. Preferably, the nuts are equipped with recesses 71 whereby, when seated on the upturned ends of the flanges 41, they will not rotate when the bolt 72 is installed. As the modular lengths of the chain track are installed the end of a chain can be pulled through the outer channel sliding it along the lower one of the guide rails.

FIGS. 6-9 illustrate a modified form of the invention in which the guide rails are extruded as a unitary one-piece element 100. In this construction the guide rails have a pair of sides 101 connected by upper and lower webs 102 and 103 creating an upper guideway 104 and a tubular return or lower guideway 105. The sides extend below the lower web and seat in the U-shaped channel 106. The channel 106 is preferably a rolled steel section and provides support for the extruded section. The channel at suitable intervals has elongated slots 107 in its lower face to receive the anchor bolts 108 which attach the channel to the Z-shaped bracket 75 which is secured to one of the conveyor cross members 14. The anchor bolts 108 are of the carriage bolt type having an elongated head which can be passed upwardly through the slots 108 and upon 90° rotation their square section seats in the slot and holds the bolt against rotation. At suitable intervals the guide element 100 is secured to the channel by screws 109 seated in elongated openings 110. The elongation of the openings 110 is to allow expansion and contraction of the plastic in response to changes in temperature.

It will be observed that the invention provides a complete modular assembly for simultaneously supporting both the upper and lower runs of the chain. Because of the lubricious, non-metallic characteristics of the guide rails the movement of the chain will not produce significant friction to increase the loading on the drive even though on the return run the pads 21 must slide along the guide rails since the chain on the return run is inverted. Because of the use of the lubricious low friction, non-metallic guide rails, the noise incident to the movement of the chain is substantially reduced. It was also very important that the chain track can be shipped, assembled in modular units to the point of installation where they can be joined one to another simply by bolting them to the cross members of the conveyor frame. The result is an installation requiring no particular skills and the simplest of tools to complete. At the same time the chain is positively and rigidly supported to assure driving contact with all of the rollers. This is important since only a slight variation in the vertical position of the chain will result in little or no propelling force being delivered from the chain pads to the rollers. The same is true if the invention is utilized in a conveyor of the type in which the chain makes direct contact with the articles rather than contacting rollers to drive the articles.

The invention provides a tube-like enclosure for the return run of the chain. This contributes to the safety of the conveyor because it prevents inadvertent contact with the chain. It also contributes to chain life because it shields the chain from detrimental substances such as dirt and corrosive chemicals which can materially reduce chain life. The complete enclosure of the return run of the chain contributes to the noise reduction.

Having described a preferred embodiment of the invention, it will be understood that various modifications can be made without departing from the principles thereof. Such modifications are to be considered as included in the hereinafter appended claims unless these claims, by their language, expressly state otherwise.

We claim:

1. A track for supporting both the advance and return runs of a conveyor chain, said track comprising: an inverted U-shaped outer channel having inwardly directed flanges along its lower side; an H-shaped guide rail having a central web forming a chain support surface; clip means for securing said guide rail to the top of said channel with said guide rail resting on the top surface of said channel; a rigid inner channel seated within said channel and a second guide rail seated thereon for supporting the return run of said chain within said outer channel; clip means securing said second rail support to said inner channel.

2. A conveyor chain track as described in claim 1 wherein said clips are frictionally and detachably secured to both said guide rails and said inner and outer channels.

3. A conveyor chain track as described in claim 2 wherein the bottom ends of the sides of said guide rail have inwardly directed ears and said clips have resilient oppositely directed fingers which seat over said ears for detachably connecting said clips and guide rail.

4. A conveyor chain track as described in claim 3 wherein said inner and outer channels each have spaced openings in their upper surfaces; said clips each having a resilient leg of a size to pass through one of said openings and forcibly clamp said clips to said channels.

5. A conveyor chain track as described in claim 1 wherein said inner channel is of inverted U-shape, the ends of the legs thereof seated on the inner surfaces of said flanges.

6. A conveyor chain track as described in claim 1 wherein said guide rails are formed of an extruded lubricious plastic material.

7. A conveyor chain track as described in claim 1 wherein the free ends of said flanges are turned upwardly; nuts seated on the ends of said flanges at spaced intervals within said inner channel for mounting a threaded fastener to secure said track to said supporting conveyor structure.

8. A conveyor chain track as described in claim 1 wherein the tops of both said outer and inner channels have spaced rectangular openings; each of said clips having a central elongated tongue offset therefrom and ears extending in the same direction as said tongue is offset and spaced to engage both ends of one of said openings to hold the clip against movement lengthwise of the channel; said clips each having laterally extending fingers along each side projecting oppositely from the offset of said finger.

9. A track for a conveyor chain including an outer channel of inverted U-shape; an inner base channel within said outer channel; a pair of guide rails each having a generally H-shaped cross section forming a recessed upper chain guideway and a recessed lower pocket separated by a web, the upper surface of which provides a chain supporting surface; means detachably securing one of said guide rails on and to the upper surface of said outer channel and for detachably securing the other of said guide rails to the upper surface of said inner base channel within said outer channel.

10. A track as described in claim 9 wherein said means includes resilient fingers having cam shaped surfaces for clamping said guide rails.

11. A track as described in claim 10 wherein said fingers seat within the lower pockets of said guide rails and said guide rails have wedge-shaped inwardly directed flanges for engaging with said fingers; said fingers and flanges having complementary inclined surfaces for urging said guide rails toward the surfaces on which they are seated.

* * * * *